United States Patent [19]

Salazar et al.

[11] Patent Number: 5,770,047
[45] Date of Patent: *Jun. 23, 1998

[54] PROCESS FOR PRODUCING REFORMULATED GASOLINE BY REDUCING SULFUR, NITROGEN AND OLEFIN

[75] Inventors: Jose Armando Salazar, Los Teques; Luis M. Cabrera, Miranda; Eusebio Palmisano, Caracas; Wolfgang J. Garcia, Miranda; Rodolfo Bruno Solari, Los Teques, all of Venezuela

[73] Assignee: Intevep, S.A., Caracas, Venezuela

[*] Notice: The term of this patent shall not extend beyond the expiration date of Pat. No. 5,576,250.

[21] Appl. No.: 661,457

[22] Filed: Jun. 11, 1996

Related U.S. Application Data

[63] Continuation-in-part of Ser. No. 247,319, May 23, 1994, Pat. No. 5,576,256.

[51] Int. Cl.$^6$ .............................. C10G 17/00; C10G 67/00
[52] U.S. Cl. .................. 208/254 R; 208/91; 208/208 R; 208/219; 208/96
[58] Field of Search ................................. 208/254 R, 89, 208/91

[56] References Cited

U.S. PATENT DOCUMENTS

| Re. 31,363 | 8/1983 | Stover | 208/254 R |
|---|---|---|---|
| 4,159,940 | 7/1979 | Smith | 208/254 R |
| 4,392,948 | 7/1983 | Debande | 208/254 R |
| 4,746,420 | 5/1988 | Darian et al. | 208/222 |
| 4,960,507 | 10/1990 | Evans et al. | 208/254 R |
| 4,960,508 | 10/1990 | Evans | 208/254 R |
| 5,576,256 | 11/1996 | Monque | 502/61 |

*Primary Examiner*—Helane Myers
*Attorney, Agent, or Firm*—Bachman & LaPointe, P.C.

[57] ABSTRACT

A process for upgrading a nitrogen and sulfur rich heavy naphtha feedstock includes the steps of providing a naphtha feedstock having an initial nitrogen content, an initial sulfur content and an initial octane number; contacting the naphtha feedstock with an acid source so as to provide a reduced nitrogen feedstock having a reduced nitrogen content which is less than the initial nitrogen content; contacting the reduced nitrogen feedstock with a hydroconversion catalyst system under a hydrogen atmosphere, temperature and pressure so as to provide a final product having a final nitrogen content which is less than the initial nitrogen content, a final sulfur content which is less than the initial sulfur content, and having a final octane number which is substantially equal to or greater than the initial octane number of the feedstock, and wherein the final product has an increased isomerized component and substantially no increase in aromatic content with respect to the feedstock.

30 Claims, 6 Drawing Sheets

PROCESS FOR PRODUCING REFORMULATED GASOLINE BY REDUCING SULFUR, NITROGEN AND OLEFIN

REFERENCE TO RELATED APPLICATION

This application is a Continuation-In-Part of U.S. patent application Ser. No. 08/247,319 filed May 23, 1994, now U.S. Pat. No. 5,576,256.

BACKGROUND OF THE INVENTION

The present invention relates to a process for hydroconversion of light and heavy feedstock, especially heavy naphtha feedstock, to a catalyst for use in hydroconversion processes with a feedstock having sulfur and nitrogen contaminants and to a process for providing such a catalyst.

Light naphtha feedstock can be treated by hydroconversion to produce premium isomerized light gasoline blending components. Numerous catalysts including the various zeolite catalysts are useful in such processes. Heavy naphtha feedstock would also be a useful source of blending components. However, conventional zeolite catalysts are rapidly deactivated by sulfur, nitrogen, coke, and other contaminants which may be present in heavy naphtha feedstock.

U.S. Pat. No. 4,734,539 to Lawlor et al. discloses such a catalyst which is useful in some applications. However, the catalyst of Lawlor et al. is susceptible to sulfur deactivation and has a one dimensional pore system which leads to rapid deactivation by coke as well.

U.S. Pat. No. 4,962,269 to LaPierre et al. also discloses a process for isomerization using zeolite catalyst. However, LaPierre et al. use Y or ZSM-20 zeolite, which is a specialty product (and therefore increases the cost of the process). LaPierre et al.'s process also leads to an undesirable increase in aromatics.

It is the primary object of the invention, therefore, to provide a process for hydroconversion of a heavy naphtha feedstock having a high content of sulfur and nitrogen contaminants so as to provide useful gasoline blending products.

It is another object of the present invention to provide a process for removing nitrogen from a naphtha feedstock so as to avoid contamination or poisoning of the hydroconversion catalyst.

It is a further object of the invention to provide a catalyst for hydroconversion processes which is not significantly deactivated by sulfur, nitrogen and coke.

It is a still further object of the invention to provide such a hydroconversion catalyst which provides significant levels of isomerization without increasing the output of aromatics.

It is another object of the invention to provide a process for preparing a catalyst in accordance with the invention.

Other objects and advantages will appear hereinbelow.

SUMMARY OF THE INVENTION

In accordance with the invention, the foregoing objects and advantages are readily attained.

In accordance with the invention, a catalyst system is disclosed which comprises a catalytically active matrix; a support medium distributed through the matrix and comprising a silicious molecular sieve material; and a catalytically active phase supported on the support medium and comprising a first metal selected from group IIIA of the periodic table of elements and a second metal selected from group VIB of the periodic table of elements.

Preferably, the catalyst systems comprises a catalytically active matrix comprising a first metal selected from group IIIA of the periodic table of elements, a second metal selected from group IIIA, a third metal selected from group VII, a fourth metal selected from group VIB, and a fifth metal selected from group VA; a support medium distributed through the matrix and comprising a silicious molecular sieve material; and a catalytically active phase supported on the support media and comprising a group IIIA metal and a group VIB metal.

In further accordance with the invention a process is disclosed for upgrading sulfur rich heavy naphtha feedstock which process comprises the steps of providing a heavy naphtha feedstock having an initial sulfur content and an initial octane number; and contacting said feedstock with a hydroconversion catalyst system under a hydrogen atmosphere, temperature and pressure so as to provide a final product having a final sulfur content which is less than the initial sulfur content of the feedstock, and having a final octane number which is substantially equal to or greater than said initial octane number of the feedstock, and wherein the final product has an increased isomerized component and substantially no increase in aromatic content with respect to said feedstock.

A two stage process wherein the feedstock is first hydrodesulfurized and then upgraded is also disclosed.

A process is also disclosed in accordance with the invention for providing the catalyst systems of the invention, which process comprises the steps of providing a support medium comprising a silicious molecular sieve material having a surface area of between about 250 $m^2/g$ to about 1200 $m^2/g$ and supporting a catalytically active phase comprising a first metal selected from group IIIA of the periodic table of elements and a second metal selected from group VIB of the periodic table of elements; providing a matrix material having a surface area of between about 50 $m^2/g$ to about 290 $m^2/g$; mixing said support medium with said matrix to form a substantially homogeneous paste having a ratio by weight of said support medium to said matrix of at least about 0.1; forming said paste into catalyst elements; and calcining said catalyst elements whereby at least a portion of said first metal of said catalytically active phase migrates from said support medium to said matrix whereby said matrix is catalytically active.

Still further, a process is provided according to the invention for removing nitrogen and sulfur from a naphtha feedstock, which process comprises the steps of providing a naphtha feedstock having an initial nitrogen content, an initial sulfur content and an initial octane number, contacting said naphtha feedstock with an acid source so as to provide a reduced nitrogen feedstock having a reduced nitrogen content which is less than said initial nitrogen content, contacting said reduced nitrogen feedstock with a hydroconversion catalyst system under a hydrogen atmosphere at hydroisomerization temperature and pressure so as to provide a final product having a final nitrogen content which is less than said initial nitrogen content, a final sulfur content which is less than said initial sulfur content, and having a final octane number which is substantially equal to or greater than said initial octane number of the feedstock, and wherein said final product has an increased isomerized component and substantially no increase in aromatic content with respect to said feedstock.

BRIEF DESCRIPTION OF THE DRAWINGS

A detailed description of preferred embodiments of the invention follows, with reference to the attached drawings, wherein.

DETAILED DESCRIPTION

The invention relates to a catalyst system, particularly a hydroconversion catalyst for use in the conversion of naphtha feedstocks including heavy naphtha, cracked naphtha, straight run naphtha and the like so as to isomerize the feedstock and provide gasoline or gasoline additives having improved RON/MON values. In accordance with the invention, the catalyst also reduces sulfur and nitrogen levels in the feedstock without rapid deactivation of the catalyst, and prevents increases in undesirable aromatics production.

The invention further relates to a process for upgrading a nitrogen rich naphtha feedstock so as to remove nitrogen, prior to contacting with the catalyst of the present invention, so as to further reduce the activation and/or poisoning of the catalyst. As will be set forth in further detail below, this process in accordance with the invention advantageously serves to provide substantial decrease in nitrogen content in an efficient process which does not add significantly to the time or cost of processing in accordance with the invention. This nitrogen removal process is well suited to use in conjunction with the sulfur removal and hydrogenation process of the present invention, and also in other applications where nitrogen removal is desired.

The catalyst of the invention includes a catalyst system comprising a matrix, a support medium within or distributed through the matrix, a catalytically active phase supported on or incorporated within the matrix so as to render the matrix catalytically active, and a catalytically active phase supported on the support medium.

The matrix preferably includes aluminum, preferably in the form of a mesoporous or gamma alumina matrix, and supports a catalytically active phase which includes a group IIIA metal, preferably gallium.

In accordance with the most preferred embodiment of the invention, the matrix further includes or supports additional metals which round out the active phase of the matrix. These metals include a group VIII metal, preferably nickel or cobalt, most preferably cobalt; a group VIB metal, preferably chromium or molybdenum, most preferably molybdenum, and a group VA metal, preferably phosphorus. Of the foregoing metals, the total ratio in the final catalyst by weight of cobalt to molybdenum is preferably between about 0.5 to 5, and the total ratio by weight of phosphorus to molybdenum is preferably at least about 0.4. This combination of metals provides the catalyst system with significantly improved and unexpected characteristics as demonstrated by the Examples discussed below.

The gallium, cobalt or nickel, molybdenum and phosphorus of the matrix active phase serve to render the matrix catalytically active so as to increase the activity of the catalyst system towards the desired dehydrogenation and hydrodesulfurization reactions.

The matrix preferably has a surface area of between about 50 m$^2$/g to about 290 m$^2$/g. The matrix is "mesoporous" in that the pore diameter of the matrix is preferably in the range of about 20 Å to about 500 Å. The matrix also preferably has a particle size distribution wherein at least 95% of the particles are smaller than 200 microns, at least 85% smaller that 90 microns, at least 60% smaller than 45 microns, and at least 40% smaller than 25 microns.

The physical characteristics of the matrix as set forth above serve to allow sufficient access of potentially heavy feedstock molecules to the support medium and catalytically active metals distributed through or supported on the matrix.

The support medium is preferably a hydrothermally stable porous crystalline silicious molecular sieve material such as zeolite catalyst or other metallosilicate, especially aluminosilicate. The support medium is preferably an MFI type zeolite such as ZSM-5 or ZSM-12 zeolite, and, according to the invention, excellent results are provided by using a mixture of ZSM-5 and ZSM-12 as will be set forth and demonstrated below. The support medium preferably has a surface area of between about 250 m$^2$/g to about 1200 m$^2$/g. The support medium is also preferably characterized by XRD techniques as showing lines between 22° and 25° of 2θ, in particular those lines located at (23, 06), (23, 226) and (23, 856) for A and those located at (20, 90), (22, 90) and (23, 17) for B, as main lines. The support medium preferably has an Si/Al atomic ratio of at least about 10, preferably between about 10 to about 200.

The catalytically active phase which is supported on the support medium preferably includes a plurality, preferably two, catalytically active metals. One metal is a group IIIA metal, preferably gallium or boron and most preferably gallium, and the other is a group VIB metal, preferably chromium. Gallium and chromium are each present as oxides in the final catalyst in an amount of between about 0.01% to about 5.0% by weight of the catalyst. Further, the total ratio by weight in the catalyst of gallium to chromium is preferably between about 1 to about 10. The final catalyst further exhibits a ratio of Si to M, where M is defined as the group IIIA metal other than aluminum plus the group VIB metal, of between about 10 to about 50.

The final catalyst preferably has a chemical surface composition characterized by the following atomic ratios: Si/Al=0.01–1.0; Si/Ga=10–250; Si/Cr=1–50; and Si/(Ga+Al+Cr+Mo+Co+P)=0.001–5.0. The catalyst preferably has a particle diameter of between about 0.5 mm to about 3 mm, a surface area of between about 140 m$^2$/g to about 250 m$^2$/g, a pore volume of between about 0.3 cc/g to about 0.9 cc/g; and a pore diameter of between about 60 Å to about 140 Å.

The catalyst according to the invention exhibits improved isomerization without increasing aromatics as shown in the Examples to follow, and also possesses resistance to deactivation by sulfur, nitrogen and coke contaminants.

Catalyst according to the invention may be prepared, according to the invention, as follows.

The zeolite support medium is provided initially supporting the desired catalytically active phase, preferably gallium and chromium. The gallium and chromium elements may be deposited on or supported by the zeolite by any means known in the art such as impregnation, exchange, direct syntheses, and the like. In this regard, the zeolite with metals may suitably be directly synthesized in accordance with the method disclosed in co-pending and commonly assigned U.S. patent application Ser. No. 08/055,089 filed May 3, 1993.

If the metals are to be impregnated onto the zeolite support, it is preferable to impregnate the chromium first, followed by the gallium, so that a good distribution of the chromium can be ensured.

Impregnation is preferably carried out with a salt of the metal in an aqueous medium. Preferable salts include $Cr(NO_3)_2 \cdot 9H_2O$ and $Ga(NO_3)_2 \cdot 9H_2O$, although others are suitable. Dissolving the salt in the aqueous medium allows an effective exchange or impregnation of the metal into the molecular sieve.

Each impregnation is preferably followed by a drying step. The drying steps may be carried out at a temperature of between about 80° C. to about 150° C. preferably about 120° C., under a flow of air containing water vapor equivalent to about 0.5 kg $H_2O$/hour-kg of catalyst for a period of between about 1 hour to about 6 hours.

The zeolite support in accordance with the invention is provided with an amount of gallium and chromium to provide the final catalyst composition with between about 0.01% wt to about 5.0% wt of each metal in oxide form. The zeolite support also preferably has a resulting Si/M atomic ratio, where M is the total active phase metal, of between about 0.01 to about 5.0.

After incorporation of the metals, which may be in oxide form, the support with metal is mixed with the alumina gel matrix material to form a substantially homogeneous paste. The paste may at this point be extruded or otherwise formed into any desired form such as, for example, cylindrical, trilobe and/or quadrilobe shapes, granules, particles or any other form in which it is desirable to provide the catalyst system of the present invention, which shapes and/or forms are collectively referred to herein as catalyst elements.

The catalyst elements are then impregnated with aqueous solutions(s) containing a mixture of the salts of the desired group VIII, VIB and VA metals. Preferred salt solutions include $Mo_7O_{23}(NH_4)_6 \cdot 4H_2O$ (ammonium heptamolybate); $Co(NO_3)_2 \cdot 6H_2O$ (cobalt nitrate); $H_3PO_4$ (phosphoric acid) and the like. The impregnated catalyst elements are then dried as described above so as to leave the desired metals deposited or impregnated onto the matrix. Of course, the desired metals may be incorporated or deposited in numerous other ways which are known to those skilled in the art. Further, the metals may also be incorporated onto the matrix prior to mixing with the support medium if desired.

Once the desired metals are in place on both the matrix and support medium, the catalyst elements are then calcined in accordance with the invention so as to provide the final catalyst product.

During the calcining procedure, a portion of the gallium originally supported on the zeolite support migrates to the alumina gel (matrix) portion of the catalyst to provide the above-mentioned surface ratios with respect to gallium. Thus, the matrix of the final catalyst comprises an alumina matrix supporting gallium in addition to the cobalt, molybdenum and phosphorus which, as set forth above, are critical in providing the desired operation of the catalyst system in accordance with the invention.

In accordance with the invention, calcining is carried out at a temperature of about 600° C. for a period of about 6 hours under a flow of air containing water vapor equivalent to about 0.5 kg $H_2O$/hour-kg of catalyst. Preferably, calcining is carried out in two stages. The first calcining stage is carried out between about 120° C. to about 350° C. for about 1–6 hours, and the second stage is carried out between about 350° C. to about 700° C. for about 1–6 hours.

The process as set forth above provides the catalyst of the invention which yields excellent isomerization of naphtha feedstock without increased aromatic production and which catalyst is resistant to deactivation from sulfur, nitrogen and coke. In accordance with the process, gallium is transferred from the support medium to the matrix where it is functional to help provide the improved characteristics of the catalyst. In accordance with the most preferred embodiment of the invention, the transferred gallium along with the cobalt, molybdenum and phosphorus of the matrix serve to provide enhanced reduction of and resistance to sulfur and nitrogen contaminants in the feedstock, and provide excellent activity of the catalyst toward the desired isomerization reaction without increasing aromatics production so as to yield upgraded products having increased octane number.

In use, the catalyst is preferably contacted with the feedstock under process conditions effective to provide the desired reaction, typically including a pressure of between about 1 bar to about 50 bars, a temperature of between about 250° C. to about 450° C., a space velocity of between about 0.1 to about 3 $h^{-1}$, a recycle gas ratio of between about 30 to about 1000 standard l/l of feed and a recycle liquid ratio of between about 1 to about 10 l/l of feed. A minimum hydrogen partial pressure at the inlet of the reaction stage is adjusted to between about 0.5 bar to about 40 bars depending upon the total pressure, generally representing about 50% hydrogen purity in the recycle stream.

The catalyst according to the invention is preferably installed in a reactor in a number of reaction stages which may be in fixed bed and/or combined bed arrangement. The process may include one or more reaction stages, swing reaction stages, liquid and gas recycle and the like, all as is known in the art. The catalyst is preferably provided in a particle diameter of about 0.5 mm to about 3.0 mm in a dense load.

A plurality of parallel reactors may also suitably be used, along with a control or sensor device to take a reactor off stream when it is ready for regeneration.

The preferred feedstock has a sulfur content of between about 1 to about 8500 ppm, although feedstocks having a sulfur content up to about 50,000 ppm may be satisfactorily treated in accordance with the invention.

A hydrodesulfurization step may be useful when large concentrations of sulfur are present in the feedstock. Conventional hydrodesulfurization techniques may be used to reduce sulfur content by factors greater than 60%. However, such sulfur reduction is frequently accompanied by loss of octane number. In accordance with the invention, such a desulfurized intermediate produce may be contacted with the catalyst system of the present invention so as to provide a final product having a further reduced sulfur content, a large fraction of isomerized product, increased octane number (which is generally increased at least to and potentially exceeding the original octane number of the feed), and no substantial increase in aromatics production. Hydrodesulfurization is generally preferred for feedstocks having sulfur content exceeding 20,000 ppm, preferably exceeding 1,000 ppm, and up to about 50,000 ppm.

The feed to be contacted with the catalyst system of the invention preferably has a sulfur content of between about 1 ppm to about 20,000 ppm, although such feedstock generally contains a minimum of at least 50 ppm of sulfur.

The feedstock may also have a nitrogen content of up to about 200 ppm, preferably no greater than about 25 ppm. In accordance with the invention, the catalyst system is substantially unaffected by these amounts of nitrogen and may be useful in reducing nitrogen in the feedstock during hydroconversion processes.

In accordance with the present invention, a process is provided for reducing the nitrogen content of a feedstock, and this process is advantageously suited to use in accordance with the hydroprocessing scheme of the present invention so as to reduce the nitrogen to which the catalyst of the present invention is exposed, and thereby further limit the deactivation and/or poisoning of the catalyst due to nitrogen.

In accordance with the invention, an initial nitrogen rich feedstock can be treated which may have nitrogen content exceeding 10,000 ppm (wt.) as well as sulfur content as described above. In accordance with the invention, and advantageously, nitrogen rich feedstocks such as those described can be treated in accordance with the invention to provide a reduced nitrogen content feedstock having a reduced nitrogen content of less than or equal to about 200 ppm, more preferably less than or equal to about 25 ppm.

Figure 1:
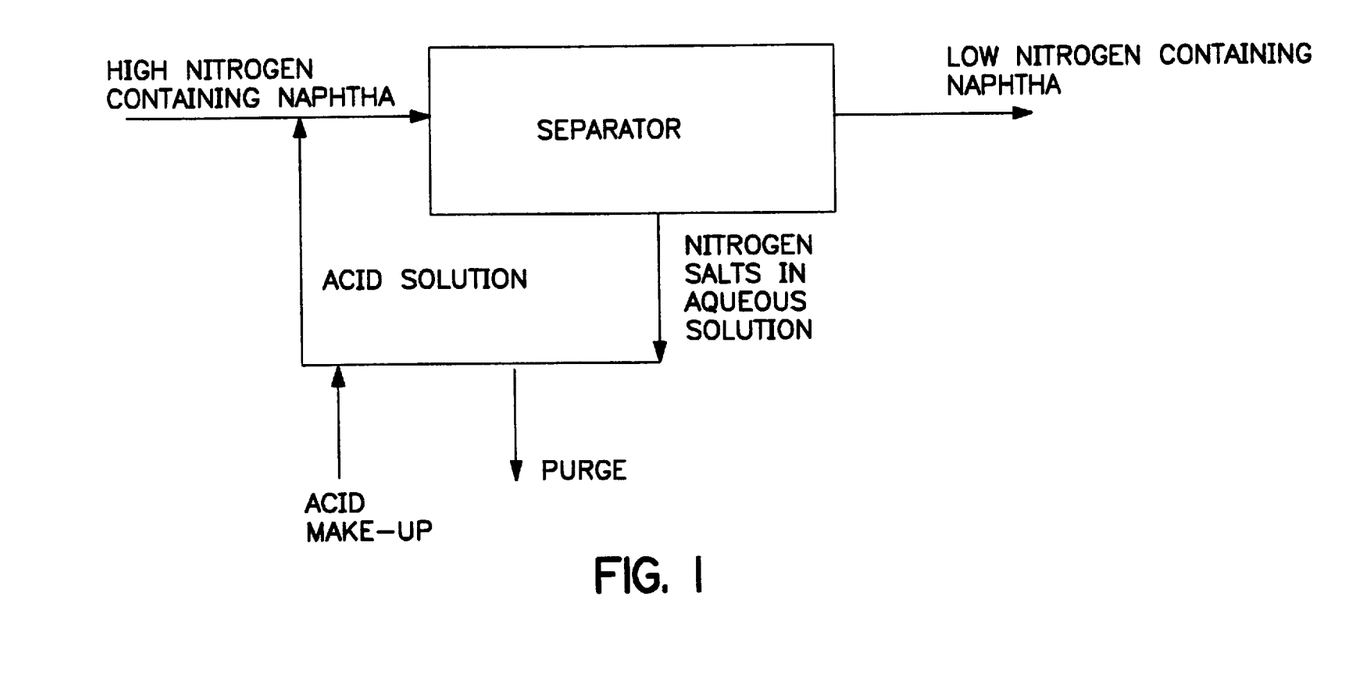
FIG. 1 is a schematic diagram of a nitrogen removal process according to the present invention.

Referring to FIG. 1, a schematic illustration of the nitrogen removal process of the present invention is provided. As shown, the nitrogen containing feedstock, such as a high nitrogen content naphtha, is contacted with an acid source, preferably an acid aqueous solution. This contact or mixing results in a removal of nitrogen from the nitrogen containing naphtha, into the aqueous solution. The mixture of low nitrogen content naphtha and nitrogen containing aqueous solution is then passed to a separator, where the low nitrogen containing naphtha is separated from the nitrogen containing aqueous solution and passed on to further processing, preferably in accordance with the hydroprocessing scheme of the present invention, while the nitrogen containing aqueous solution is treated, in accordance with the invention, so as to remove nitrogen and rebuild the acid concentration of the aqueous solution for re-use in mixing or contacting with a high nitrogen content naphtha in accordance with the invention.

Without being bound by any particular theory, it is believed that the nitrogen found in high nitrogen content naphtha is typically in the form of highly basic amines, such as aliphatic amines which are stronger bases than ammonia, aromatic or cyclic amines such as aniline, indol or pyridine, and the like. In accordance with the invention, during contact with an acid solution, amines react with acid to form salts in accordance with the following general formula:

$R_3NH_2+ACID \rightarrow AMINE\ SALT$

In accordance with the foregoing, an advantageous improvement in properties of the nitrogen is provided. Amines from the naphtha feedstock are typically odiferous liquids or gases which are soluble in hydrocarbon solvents. The amine salts formed in accordance with the present invention, however, are odorless, nonvolatile solids and are typically insoluble in hydrocarbon solvents. These amine salts are, however, soluble in water. Thus, the contact or mixture of high nitrogen content naphtha and acid solution results in the extraction of nitrogen into the acid solution according to the invention so as to provide a low nitrogen content naphtha and an aqueous solution containing amine salts as set forth above.

In further accordance with the process of the present invention, the reduced nitrogen content naphtha and nitrogen containing aqueous solution may then suitably be passed to a separator, which may be any conventional oil/water separator or other device as known to one of ordinary skill in the art, so as to separate the low nitrogen containing naphtha from the nitrogen containing aqueous solution as desired in accordance with the present invention.

As set forth above, the low nitrogen containing naphtha, which now typically and preferably has a nitrogen content of less than or equal to about 200 ppm, more preferably less than or equal to about 25 ppm, can then be passed to contact and treatment with the catalyst system of the present invention which will advantageously provide enhanced life and activity of the catalyst system of the present invention, or can be treated in other manners as desired.

In further accordance with the invention, the nitrogen containing aqueous solution can then be treated so as to remove or purge amine salts therefrom in any manner known in the art. The aqueous solution, now purged of amine salts, is then passed to an acid make-up station where additional acid is added in accordance with the present invention so as to rebuild or return the acid content to the desired level. The recycled acid solution can then advantageously be used in accordance with the present invention for further mixing or contacting with the high nitrogen content naphtha stream in accordance with the invention.

The step of contacting high nitrogen content naphtha and acid solution is preferably carried out at ambient pressure and temperature. Further, naphtha and acid solution are preferably mixed or contacted at a ratio of naphtha:acid solution of less than or equal to about 50:50, more preferably between about 50:50 to about 30:70 (% vol).

The acid solution to be contacted with high nitrogen content naphtha in accordance with the process of the present invention is preferably a solution of acid selected from the group consisting of hydrochloric acid, sulfuric acid, nitric acid and mixtures thereof in water. The concentration of acid in the acid solution in accordance with the present invention is preferably at least about 0.001 mol/l, more preferably between about 0.001 mol/l to about 0.010 mol/l.

Still further in accordance with invention, it is preferred that the acid solution to be mixed with high nitrogen content naphtha in accordance with the present invention contain acid in an amount less than or qual to about ten times the initial nitrogen content of the naphtha feedstock, on a per unit time basis.

It should be noted that the process for removing nitrogen in accordance with the present invention is advantageously suitable for use as a pretreatment step in connection with the hydroprocessing scheme of the present invention. Furthermore, it should be noted that the nitrogen removing process of the present invention could be used to reduce nitrogen content in feedstocks to be treated using other processes or catalyst systems, as well.

The final product after contact with the catalyst system according to the invention is characterized by an upgraded product having improved characteristics. The final product exhibits an increase in isomerized component of about 5–20%. Sulfur is reduced in varying amounts depending upon whether a hydrodesulfurization step is used. If a hydrodesulfurization step is used, sulfur may be reduced by greater than 60%, typically between about 60% to about 70%. If the feedstock is fed directly to the hydroconversion catalyst of the present invention, sulfur reduction is typically at least about 20% to about 40% and may be as great as about 30% to about 70%. The final product also exhibits a substantially unchanged aromatic content, and an octane number greater than about 85 RON (83 MON). The actual increase in octane number, of course, depends upon the feedstock. A heavy straight run naphtha may typically be increased by about 30 to about 40 RON, while a heavy cracked naphtha cut may be increased by about 2 to about 10 RON.

The final product resulting from contact with the hydroconversion catalyst according to the invention also exhibits improved distillation temperature or T90 values, as will be demonstrated in the examples to follow.

EXAMPLE 1

This example illustrates the preparation of two catalysts according to the invention. The chemical compositions of the two catalysts are set forth below in Table 1. The catalysts were prepared as follows.

H-ZSM5 zeolite was provided as the support medium and impregnated with aqueous solutions of $Cr(NO_3)_3 \cdot H_2O$ and $Ga(NO_3)_3 \cdot 9H_2O$. The impregnated zeolite was combined with a gamma alumina matrix to form a substantially homogeneous paste, which was extruded and dried. The extruded catalyst elements were then impregnated with aqueous solutions of $Mo_7O_{23}(NH_4)_6 \cdot 4H_2O$, $Co(NO_3)_2 \cdot 6H_2O$ (Catalyst #1), $Ni(NO_3)_2$ (Catalyst #2), and $H_3PO_4$. The impregnated solid was then dried and calcined so as to provide the catalysts described in Table 1.

TABLE 1

Chemical composition of the catalyst

|  | $CoMoP/Al_2O_3$ + GACR/H-ZSM-5 | $NiMoP/Al_2O_3$ + GaCr/H-ZSM-5 |
| --- | --- | --- |
| Al (%) | 18.0 | 16.9 |
| Si (%) | 24.0 | 16.4 |
| Mo (%) | 4.87 | 4.9 |
| Co (%) | 3.10 | 0 |
| P (%) | 1.30 | 0.9 |
| Cr (ppm) | 809 | 612 |
| Ga (ppm) | 3773 | 1210 |
| Ni (%) | 0 | 4.1 |
| Mechan. Resist. kg/p | 5.7 | 4.7 |
| Area (m²/g) | 204 | 213 |

The surface composition of catalyst #1 was determined by XPS technique as follows:

TABLE 2

| Elements | % |
| --- | --- |
| Co ($2p_{3/2}$) | 0.83 |
| Mo (3d) | 1.025 |
| P | 0.54 |
| Al (2p) | 17.43 |
| Si (2P) | 22.68 |
| Ga ($2p_{3/2}$) | 0.16 |
| Cr ($2p_{3/2}$) | 0.16 |
| O (1s) | 58.26 |

EXAMPLE 2

This example illustrates the importance of both the active metal supported on the zeolite support medium and also on the matrix. Three catalysts were prepared as shown in Table 3:

TABLE 3

Catalyst Composition

| CATALYST | COMPOSITION |
| --- | --- |
| A | $CoMoP/Al_2O_3$ + GaCr/H-ZSM-5 |
| B | $CoMoP/Al_2O_3$ + H-ZSM-5 |
| C | $Al_2O_3$ + GaCr/H-ZSM-5 |

Catalyst A is the most preferred catalyst according to the invention, and has active phases on both the matrix and zeolite support. Catalyst B does not have active metal on the zeolite. Catalyst C has active metal on the zeolite, but does not include the CoMoP metals on the matrix which only has a portion of Ga transferred during calcination as described above.

Catalysts A, B and C were used in hydroisomerization of n-octane at a temperature of 350° C., pressure of 400 psi, $H_2$/n-C8 ratio of 7.33 v/v and a LHSV of 3.75 $h^{-1}$. Table 4 contains the results obtained.

TABLE 4

|  | CATALYST A | CATALYST B | CATALYST C |
| --- | --- | --- | --- |
| Total Conversion (%) | 54.46 | 70.68 | 52.22 |
| Gas Yield (%) | 14.87 | 36.35 | 19.43 |
| Liquid Yield ($C_{5+}$) (%) | 39.60 | 34.32 | 33.04 |
| Gas Product Selectivity (%) | 27.30 | 51.43 | 37.21 |
| $C_{5+}$ Liquid Product Selectivity (%) | 72.70 | 48.57 | 63.29 |
| Saturated Linear Products (%) | 5.79 | 9.35 | 5.18 |
| Isomers $C_{5+}$ (%) | 49.72 | 32.36 | 38.64 |
| Unsaturated Liquid Products (%) | 0.70 | 1.04 | 0.46 |
| Cyclic Products (%) | 10.55 | 5.43 | 9.10 |
| Aromatics (%) | 5.94 | 0.39 | 9.41 |

As shown, Catalyst A provides the highest selectivity toward isomers and the lowest gas formation. Catalyst B exhibits a relatively high gas product selectivity, but is lowest in the desired isomer formation. Catalyst C, formulated in accordance with the broader aspect of the invention, provides less total conversion and less selectivity toward $C_{5+}$ liquid products, but good isomerization.

Thus, in accordance with the invention, Catalyst A having active phases containing Ga+Cr as well as Co, Mo and P provides the best results.

Catalyst C, also formulated in accordance with the invention so as to have gallium transferred to the matrix, also provides desirable results.

EXAMPLE 3

Catalyst A of Example 2 was further used in hydroisomerization of heavy virgin naphtha under hydroconversion conditions similar to Example 2 but at different pressures of 150 and 400 psig so as to demonstrate the effect of pressure on the hydroisomerization process of the present invention. Table 5 contains the results.

TABLE 5

|  | FEED | PRODUCTS | |
| --- | --- | --- | --- |
|  |  | 150 | 400 |
| Pressure (psig) |  |  |  |
| API | 58.9 | 58.0 | 61.0 |

TABLE 5-continued

|  | FEED | PRODUCTS | |
|---|---|---|---|
| Sulfur (ppm) | 94 | 49 | 25 |
| Nitrogen (ppm) | <1 | <1 | <1 |
| Br number | <1 | <1 | <1 |
| RVP (psi) | 2.81 | 5.60 | 7.0 |
| RON | 57.9 | 69.6 | 80.0 |
| MON | 57.0 | 69.6 | 80.0 |
| Paraffins (% V) | 56 | 49 | 52 |
| Olefins (% V) | 0 | 1 | 0 |
| Naphtenes (% V) | 32 | 33 | 31 |
| Aromatic (% V) | 12 | 17 | 16 |
| Simulated Distillation °F. (T90) | | | |
| 0/10 | 133/169 | 81/160 | 77/138 |
| 30/50 | 214/248 | 210/244 | 196/239 |
| 70/90 | 284/324 | 282/324 | 270/297 |

As shown, the process improves as pressure increases from 150 to 400 psig. Specifically, sulfur reduction, RON, API gravity and T90 are all improved. Note also that aromatic and olefin content remain substantially unchanged as desired, and that the Reid vapor pressure remains below 9 psi.

EXAMPLE 4

This example illustrates a two stage process using a commercial hydrodesulfurization catalyst and process followed by hydroconversion using Catalyst A of Example 2 according to the invention. Hydrodesulfurization was carried out at 340° C. and 400 psig, and a ratio of $H_2/HC$ of 500 Nv/v and LHSV of 1.0 $h^{-1}$. Hydroisomerization of the intermediate product was then carried out at 330° C., 700 psig, $H_2/HC$ ratio of 500 Nv/v and LHSV of 0.75 $h^{-1}$. The results are contained in Table 6.

TABLE 6

|  | Heavy Cracked Naphtha | Hydro-desulfurization Intermediate | Hydro-isomerization Final Product |
|---|---|---|---|
| API | 46.3 | 52.3 | 56.5 |
| Sulfur (ppm) | 8910 | 31 | <20 |
| RON | 77 | 44 | 81 |
| T90 (°F.) | 410 | 385 | 334 |
| Br No. | 78 | <1 | <1 |
| Yield (% wt.) |  | 95 | 90 |

As shown, hydrodesulfurization reduces sulfur, but octane number (RON) as well. The catalyst of the present invention restores the lost octane number to a level higher than the feed, further reduces sulfur content, increases API gravity, and reduces T90, all as desired in accordance with the present invention.

EXAMPLE 5

This example illustrates a two stage process similar to Example 4 but using a heavy FCC naphtha feedstock and Catalyst A of Example 2.

Hydrodesulfurization was carried out at 340° C., 400 psig, $H_2/HC$ ratio of 500 Nv/v and LLISV of 1.0 $h^{-1}$. Hydroisomerization was then carried out at 330° C., 700 psig, $H_2/HC$ ratio of 500 Nv/v and LHSV of $0.75^{-1}$. The results of this example are set forth below in Table 7.

TABLE 7

|  | Heavy FCC Naphta | Hydro-desulfurization Intermediate | Hydro-isomerization Final Product |
|---|---|---|---|
| API | 33.2 |  |  |
| Sulfur (ppm) | 3820 | 30 | 28 |
| RON | 92.8 | 88.1 | 91 |
| T90 (°F.) | 459 | 385 | 455 |
| Br No. | 11 |  |  |
| $C_{5+}$ (% wt.) |  |  | 94 |

As shown, sulfur content is further reduced by Catalyst A, and RON is restored almost to the original value.

EXAMPLE 6

This example demonstrates that an atmospheric straight-run naphtha with low sulfur content (60 ppm) can be treated with the catalyst of the present invention to provide transformation to more suitable isomerized hydrocarbon products with high RON and MON values, and low RVP (Reid Vapor Pressure) and aromatic content, by contacting the feedstock with the catalyst under the following conditions:

Reaction temperature=280° C.–320° C.

Total Pressure=200 psig $H_2$/HC feedstock molar ratio=3

L.H.S.V.=1–2 $h^{-1}$

The feedstock is pre-heated by means of conventional heat-exchanger with product stream before contact with the catalyst of the present invention. Table 8 sets forth the volumetric boiling point distribution (T90) obtained after reaching the steady state of reaction. Benefits obtained by use of the catalyst of the present invention can be summarized as follows: low RVP; good HDS activity (sulfur removal); high content of light and medium isomerized product with high octane number (RON and MON); and the original content of aromatics which remain unchanged through the reaction.

TABLE 8

| Feedstock and product properties | | |
|---|---|---|
|  | Feedstock | Product |
| Dist (% vol.) | | |
| IBP - 10 | 36–86 | 95–98 |
| 30–50 | 101–117 | 103–109 |
| 70–90 | 135–157 | 114–119 |
| FBP | 195 | 125 |
| API gravity | 55 | 65 |
| Octane RON | 55 | 85 |
| Aromatics (% vol.) | 17 | 17 |
| Sulfur | 60 ppm | 5 ppm |

EXAMPLE 7

This example demonstrates that light cuts of FCC (65° C.–170° C.) with moderate content of sulfur (600 ppm) can also be used directly as regular feedstock to the catalyst of the present invention to produce light isomerized gasoline with high RON and MON, with no aromatic production, good sulfur removal and a better resulting RVP.

The example was run by contacting the feedstock with the catalyst under the following conditions:

Reaction temperature=320° C.–350° C.

Total Pressure=400 psig
H$_2$/HC feedstock ratio=5
L.H.S.V.=0.75 h$^{-1}$

The feedstock was pre-heated by means of conventional heat-exchanger with product stream before contact with the catalyst of the present invention. Volumetric boiling point distribution obtained after reaching the steady state of reaction is presented and compared in Table 9.

TABLE 9

Feedstock and product properties

|  | Feedstock | Product |
|---|---|---|
| Dist (% vol.) |  |  |
| IBP - 10 | 72–84 | 65–73 |
| 30–50 | 92–117 | 83–95 |
| 70–90 | 139–150 | 107–122 |
| FBP | 162 | 148 |
| API gravity | 55 | 57 |
| Octane RON | 92.6 | 95.2 |
| Sulfur | 600 ppm | 74 ppm |

The product was a light isomerized gasoline having a high RON number, improved RVP and less sulfur with no aromatic production.

EXAMPLE 8

This example demonstrates that the catalyst of the invention must include an MFI type zeolite (or metallosilicate) rather than other types of zeolite because of its selectivity toward light isomerized products from either straight-run or heavy cracked naphtha, with or without high sulfur content. In this example, and also in Examples 9–11 to follow, cobalt, molybdenum and phosphorus metals were not added to the matrix so as to more clearly demonstrate the influence of a change in zeolite.

Preparation of GaCrIHY(non-MFI) Catalyst

The catalyst is prepared by an identical procedure used to prepare the MFI based catalyst. 100 g of commercial HY zeolite are impregnated with aqueous solutions of Cr(NO$_3$)$_3$.9H$_2$O and Ga(NO$_3$)$_3$.9H$_2$O, until a total amount of about 0.01% to 5% by weight metals are present and the Ga/Cr atomic ratio is in the range of 1 to 10. The impregnated support medium was combined with a matrix (alumina) so as to form homogeneous paste which was extruded and then calcined.

This catalyst was then compared with the MFI based catalyst prepared according to the invention, formed with same metals and amounts and prepared by identical procedure on a commercial H-ZSM-5 zeolite. The results are set forth below in Table 10.

TABLE 10

Activity and selectivity of the catalysts

|  | GaCr/Hy + alumina | GaCr/ZSM-5 + alumina |
|---|---|---|
| Liquid yield (%) | 46.81 | 59.88 |
| BTX (%) | <1 | <1 |
| Isomers C$_5$+ (%) | 3.73 | 34.72 |
| I/C ratio | <1 | 1.04 |
| Gas yield (%) | 53.19 | 40.12 |
| C$_1$–C$_4$ (%) | 77.28 | 94.55 |
| C$_3$ = (%) | 22.72 | 5.45 |

Table 10 clearly shows the improved activity, selectivity and stability of GaCr/ZSM-5 catalyst to produce light isomerized gasoline from similar feedstock at the same operational conditions used to run Example 6, rather than the undesirable cracking and dehydrogenating activity exhibited by GaCr/HY catalyst under the same conditions and with the same feedstock.

EXAMPLE 9

This example demonstrates that the support medium of the catalyst must include both gallium and chromium to produce the best catalytic isomerization of naphtha feedstock (cracked or not). Three catalysts are prepared, one with only gallium (Ga/ZSM-5), one with only chromium (Cr/ZSM-5), and the third with both gallium and chromium in accordance with the invention (GaCr/ZSM-5). Each catalyst was prepared so as to contain the same total amount of gallium, chromium, and gallium plus chromium, respectively.

Preparation of Ga/ZSM-5 catalyst

This catalyst is prepared by an identical procedure used to prepare the GaCr/ZSM-5 based catalyst of the present invention. 100 g of the same commercial HZSM-5 zeolite used to prepare the GaCr based catalyst are impregnated with an aqueous solution of Ga(NO$_3$)$_3$.9H$_2$O, as the only active metal present. The impregnated support medium was combined with the alumina matrix so as to form a homogeneous paste which was extruded and then calcined.

Preparation of a Cr/ZSM-5 Catalyst

This catalyst is prepared by an identical procedure used to prepare the GaCr/ZSM-5 based catalyst of the present invention. 100 g of the same commercial HZSM-5 zeolite used to prepare the GaCr based catalyst are impregnated with an aqueous solution of Cr(NO$_3$)$_3$.9H$_2$O, as the only active metal present. The impregnated support medium was combined with the alumina matrix so as to form a homogeneous paste which was extruded and then calcined.

These catalysts were compared with the GaCr/ZSM-5 based catalyst, formed with same metals and amounts and prepared by identical procedure on the same commercial H-ZSM-5 zeolite. The results are set forth below in Table 11.

TABLE 11

Activity and selectivity of the catalysts

|  | Ga/ZSM-5 + alumina | Cr/ZSM-5 + alumina | GaCR/ZSM-5 + alumina |
|---|---|---|---|
| Liquid yield (%) | 10.16 | 56.55 | 59.88 |
| BTX (%) | >89 | <1 | <1 |
| Isomers C$_5$+ (%) | 2.13 | 10.62 | 34.72 |
| I/C ratio | 1.02 | 1.03 | 1.04 |
| Gas yield (%) | 89.84 | 43.45 | 40.12 |

Table 11 clearly shows the improved activity, selectivity and stability of the GaCr/ZSM-5 catalyst according to the invention to produce light isomerized gasoline from similar feedstock at the same operational conditions used to run Example 6. Undesirable side-reactions, such as aromatization in the case of Ga/ZSM-5 catalyst, and cracking and dehydrogenating activity in the case of Cr/ZSM-5 catalyst, are favored if Ga and Cr are not both present in the final catalyst.

EXAMPLE 10

The catalyst of the present invention was analyzed to show that the final catalyst, after activation (or calcination), has a gallium enrichment on the surface of the catalyst which is believed to result from a shift of gallium from the support medium to the matrix to provide a $Ga_2O_3/Al_2O_3$ matrix having catalytic activity.

Preparation of GaCr/ZSM-5 catalyst 100 g of commercial ZSM-5 zeolite are impregnated with aqueous solutions of $Cr(NO_3)_3 \cdot 9H_2O$ and $Ga(NO_3)_3 \cdot 9H_2O$ until a total amount of about 0.01% to 5% by weight of such metals are present and the Ga/Cr atomic ratio is in the range of 1 to 10. The impregnated support medium was combined with alumina matrix so as to form a homogeneous paste, which was extruded and then calcined.

The catalyst surface with and without activation is characterized by using XPS (X-ray Photoelectron Spectroscopy) technique. The relative abundance of elements was tested using an Al α anode as a source of X-ray emissions. The results obtained are found in Table 12.

TABLE 12

XPS surface characterization of the catalyst with and without calcination

| GaCr/ZSM-5 + $Al_2O_3$ | Dried fresh catalyst | Activated |
| --- | --- | --- |
| Si/Al surface ratio = | 0.1475 | 0.1711 |
| Si/Ga surface ratio = | 8.5968 | 7.4750 |
| Si/Cr surface ratio = | 42.98 | 37.37 |
| Ga/Si + Al + Cr surface ratio = | 0.015 | 0.020 |
| Area superficial BET = 300 +/- 10 m²/g | | |

Fresh catalyst simply dried exhibits less gallium at the surface of the catalyst (high Si/Ga ratio) than the activated one (low Si/Ga ratio). The activated catalyst also showed less aluminum and more chromium at the surface. Thus, the activation step provides a gallium enrichment on the surface of the catalyst resulting from the shift of the gallium to the matrix so as to enhance the catalytic activity of the matrix.

EXAMPLE 11

This example demonstrates that the shift of gallium to the matrix to form $Ga_2O_3/Al_2O_3$ makes the matrix a catalytically active phase that provides more activity to the final catalytic system.

To run this test, a sample of $Ga_2O_3/Al_2O_3$ mixture is prepared by conventional procedure and placed in the reactor under the same reaction conditions used in Example 6.

Another test is run under the same conditions of Example 6, using unextruded (no alumina content) GaCr/ZSM-5 as catalyst.

The results obtained were compared with Example 6.

Table 13 clearly shows that the catalyst GaCr/ZSM-5+ $Al_2O_3$ of the invention exhibits more activity for this reaction than the sum of activities observed with the simple mixture of GaCr/ZSM-5 catalyst and $Ga_2O_3/Al_2O_3$, with less gas yield and significantly more isomer production. The mixture also exhibited more aromatics and coke formation. Furthermore, this comparison also demonstrates that the claimed catalyst is a more stable and selective catalyst for this process.

TABLE 13

Activity and selectivity of the catalysts
Quality product distribution
(Run time = 6 hours)

| | $Ga_2O_3/Al_2O_3$ | GaCr/ZSM-5 | GaCr/ZSM-5 + $Al_2O_3$ |
| --- | --- | --- | --- |
| Total conversion (%) | 3.58 | 43.88 | 52.18 |
| Gas yield ($C_1$–$C_4$) (%) | 14.01 | 25.63 | 19.43 |
| Liquid yield ($C_5^+$) (%) | 85.99 | 74.37 | 80.57 |
| Isomers ($C_5^+$) (%) | 0.01 | 28.76 | 30.80 |
| Cyclic products (%) | >0.01 | 1.48 | 2.11 |
| Saturated linear products (%) | 98.57 | 10.64 | 8.15 |
| Unsaturated liquid products (%) | >0.05 | 1.53 | 4.85 |
| Aromatic products (%) | >0.01 | 0.78 | 1.88 |
| Coke (%) | 1.34 | 2.89 | 4.56 |

These results clearly confirm the regenerability, stability and reproducibility of the catalyst prepared according to the present invention.

EXAMPLE 12

This example illustrates the removal of nitrogen from a high nitrogen content FCC-C8+ naphtha fraction feedstock in accordance with the invention.

Figure 2:
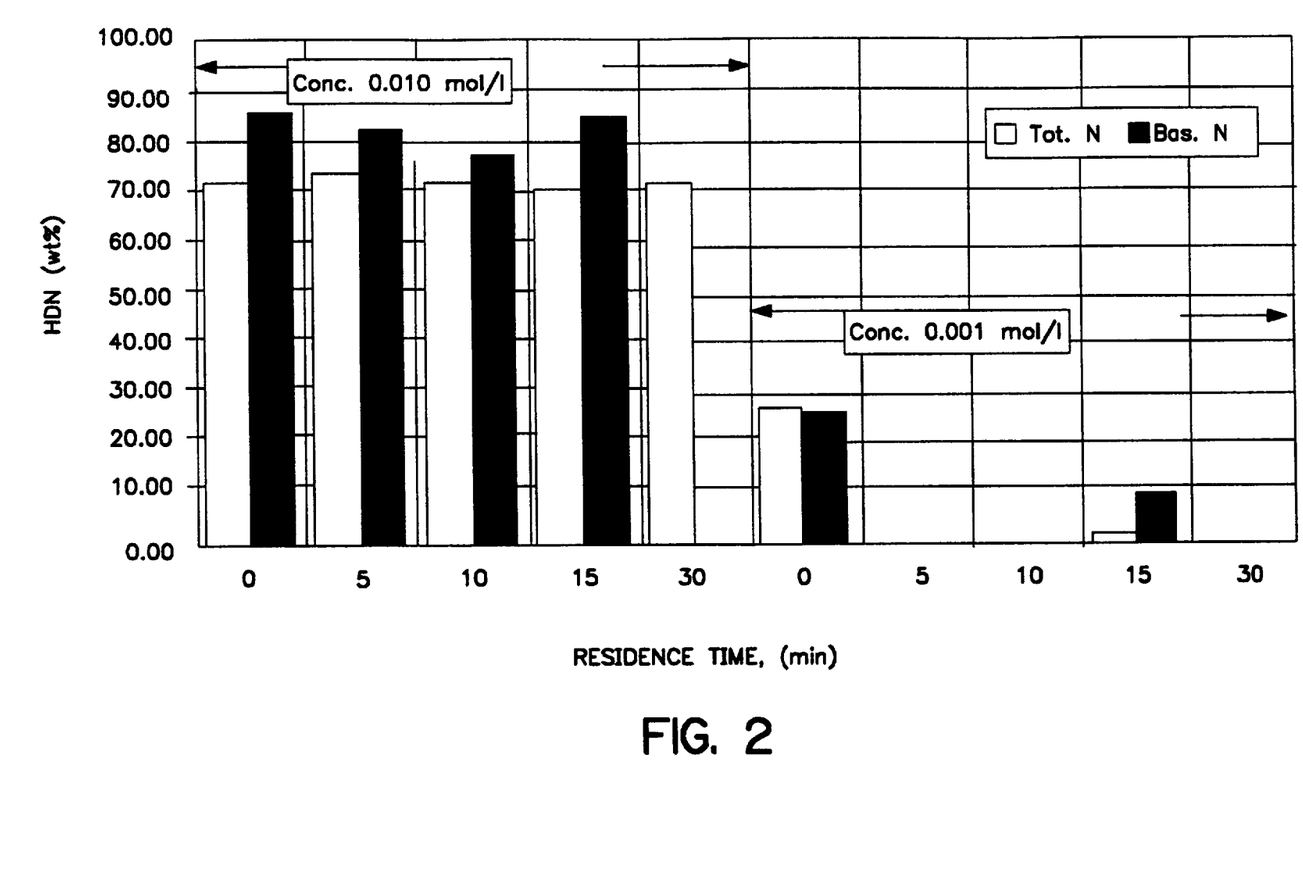
FIG. 2 illustrates the results of nitrogen removal from an FCC-C8+ naphtha fraction using acid concentrations of 0.010 mol/l and 0.001 mol/l at a ratio of naphtha:acid solution of 50:50 (% vol)
Figure 3:
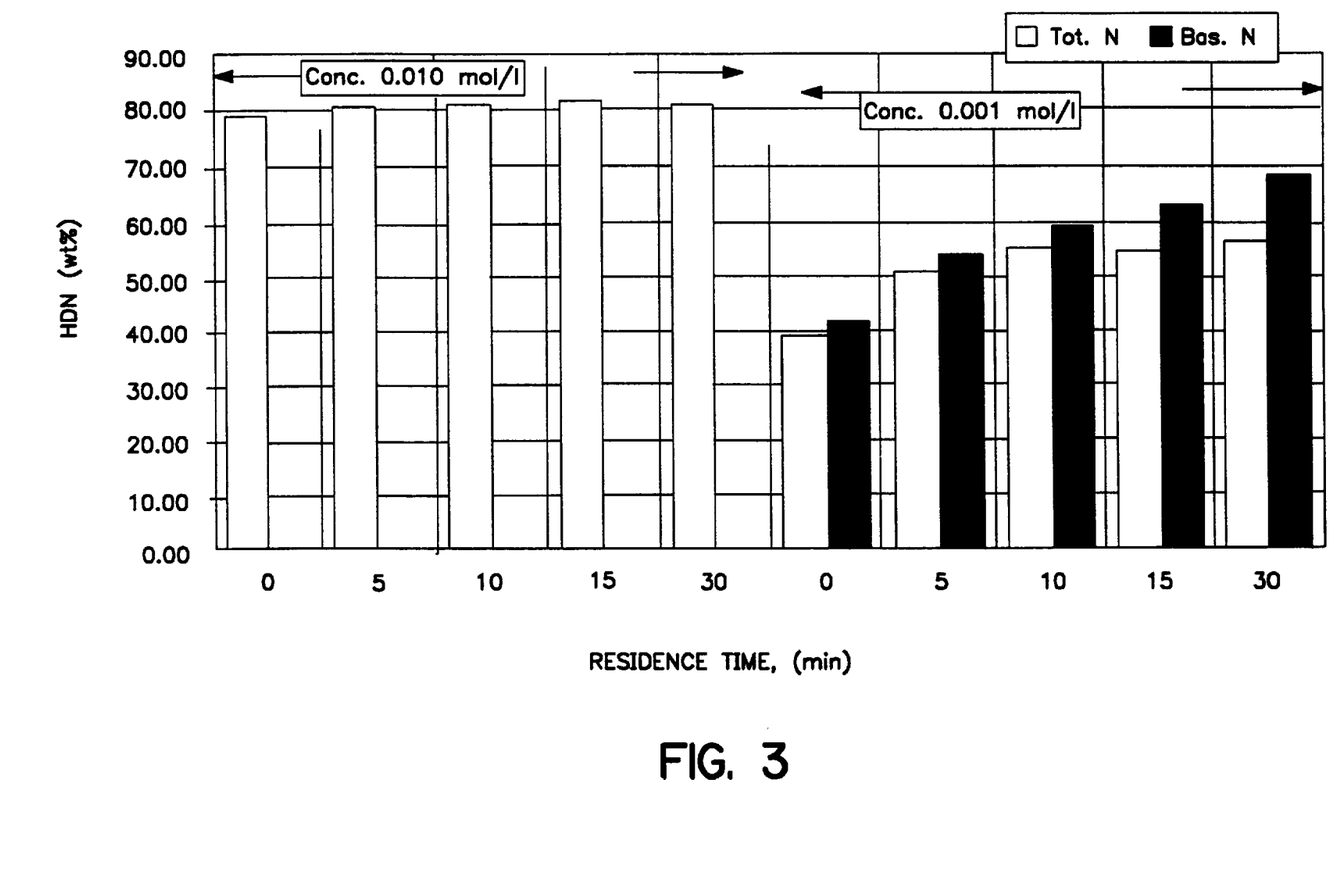
FIG. 3 illustrates the results of nitrogen removal from an FCC-C8+ naphtha fraction using acid concentrations of 0.010 mol/l and 0.001 mol/l at a ratio naphtha:acid solution of 30:70 (% vol)

A naphtha feedstock having an initial nitrogen content of 91 ppm (wt.), 84.3 ppm (wt.) as basic nitrogen, was contacted with hydrochloric acid aqueous solutions having concentrations of 0.001 and 0.010 mol/l. The high nitrogen content naphtha feedstock was contacted with the hydrochloric acid solutions at ratios of naphtha:acid solution of 50:50 (% vol) and 30:70 (% vol). After the initial contact, a low nitrogen content naphtha was provided, as well as an amine salt containing aqueous solution. The low nitrogen content naphtha was measured for nitrogen content, and the hydrodenitrofication (HDN) in terms of weight percent was calculated. FIGS. 2 and 3 attached hereto illustrate the results of these tests for ratios of naphtha:acid solution of 50:50 and 30:70 respectively.

Referring to FIG. 2, it can be seen that for the acid concentration 0.010 and naphtha:acid solution ratio of 50:50, residence time did not significantly affect the HDN values.

Referring to FIG. 3, it can be seen that reducing the naphtha: acid solution ratio to 30:70 provides excellent results at acid concentration of 0.001 mol/l as well.

Additional nitrogen removal process were carried out, using higher concentrations of acid in the acid solution, and also using higher ratios of naphtha:acid solution, namely a ratio of 70:30. Referring to Table 14, the results of the foregoing nitrogen removal tests are set forth.

TABLE 14

Example No. 12. Evaluation of Nitrogen removal from a FCC-C8+ fraction

| TEST | RATIO NAPHTHA/ACID SOL % v/v | CONCENTRATION SOL(HCL) N(mol/l) | TIME (min) | TOT N2 wppm | BAS N2 wppm | SULFUR wppm | TOT CL wppm | INORG CL wppm |
|---|---|---|---|---|---|---|---|---|
| FEED | — | — | — | 91.0 | 84.3 | 1045.4 | 0 | 0 |
| 1 | 50/50 | 0.010 | 0 | 25.6 | 11.9 | — | — | — |
| 2 | 50/50 | 0.010 | 5 | 24.2 | 14.9 | — | — | — |
| 3 | 50/50 | 0.010 | 10 | 25.7 | 17.6 | — | — | — |
| 4 | 50/50 | 0.010 | 15 | 27.0 | 12.4 | — | — | — |
| 5 | 50/50 | 0.010 | 30 | 25.8 | — | — | — | — |
| 6 | 50/50 | 0.001 | 0 | 67.3 | 63.2 | — | — | — |
| 7 | 50/50 | 0.001 | 5 | 100.0 | 86.9 | — | — | — |
| 8 | 50/50 | 0.001 | 10 | 96.7 | 86.0 | — | — | — |
| 9 | 50/50 | 0.001 | 15 | 89.6 | 76.5 | — | — | — |
| 10 | 50/50 | 0.001 | 30 | 104.5 | — | — | — | — |
| 11 | 30/70 | 0.010 | 0 | 19.2 | — | — | — | — |
| 12 | 30/70 | 0.010 | 5 | 17.6 | — | — | — | — |
| 13 | 30/70 | 0.010 | 10 | 17.4 | — | — | — | — |
| 14 | 30/70 | 0.010 | 15 | 16.7 | — | — | — | — |
| 15 | 30/70 | 0.010 | 30 | 17.6 | — | — | — | — |
| 16 | 30/70 | 0.001 | 0 | 55.5 | 49.0 | — | — | — |
| 17 | 30/70 | 0.001 | 5 | 44.8 | 38.8 | — | — | — |
| 18 | 30/70 | 0.001 | 10 | 40.8 | 34.3 | — | — | — |
| 19 | 30/70 | 0.001 | 15 | 41.3 | 31.3 | — | — | — |
| 20 | 30/70 | 0.001 | 30 | 39.6 | 26.7 | — | — | — |
| 41 | 50/50 | 0.010 | 0 | 17.8 | 11.3 | 1028.0 | 0.82 | 0.74 |
| 42 | 50/50 | 0.010 | 5 | 15.2 | 10.4 | 1027.0 | 2.50 | 2.29 |
| 43 | 50/50 | 0.010 | 10 | 18.4 | 11.6 | 1000.0 | 0.72 | 0.65 |
| 44 | 50/50 | 0.010 | 15 | 20.9 | 12.4 | 1000.0 | 1.80 | 1.62 |
| 45 | 30/70 | 0.010 | 5 | 12.7 | 6.2 | 1130.0 | 0.78 | 0.70 |
| 46 | 70/30 | 0.010 | 5 | 16.4 | 5.7 | 1220.0 | 0.86 | 0.79 |
| 47 | 50/50 | 0.020 | 5 | 14.1 | 5.0 | 1030.0 | 0.81 | 0.74 |
| 48 | 30/70 | 0.020 | 5 | 7.4 | 4.0 | 977.0 | 0.78 | 0.71 |
| 49 | 70/30 | 0.020 | 5 | 23.3 | 14.4 | 985.0 | 0.73 | 0.66 |
| 50 | 50/50 | 0.030 | 5 | 14.2 | 5.6 | 1041.0 | 0.34 | 0.32 |
| 51 | 30/70 | 0.030 | 5 | 12.6 | 5.2 | 1080.0 | 0.22 | 0.19 |
| 52 | 70/30 | 0.030 | 5 | 23.8 | 14.1 | 1097.0 | 0.17 | 0.14 |
| 53 | 50/50 | 0.040 | 5 | 13.1 | 4.6 | 1039.0 | 0.20 | 0.17 |
| 54 | 30/70 | 0.040 | 5 | 10.3 | 4.4 | 1040.0 | 0.22 | 0.19 |
| 55 | 70/30 | 0.040 | 5 | 15.4 | 13.8 | 1014.0 | 0.21 | 0.19 |
| 56 | 50/50 | 0.050 | 5 | 17.3 | 4.7 | 1080.0 | 0.23 | 0.19 |
| 57 | 30/70 | 0.050 | 5 | 11.6 | 4.5 | 1000.0 | 0.22 | 0.20 |
| 58 | 70/30 | 0.050 | 5 | 15.7 | 6.0 | 1029.0 | 0.21 | 0.19 |

As set forth in Table 14, it can be seen that that the increase of acid concentration above 0.010 mol/l does not significantly improve the efficiency of the nitrogen removal. Further, increase of the naphtha:acid solution ratio to 70:30 did not provide comparatively favorable results.

EXAMPLE 13

This example illustrates the nitrogen removal process of the present invention using an FCC full range naphtha feedstock. For this example, nitrogen removal processes were carried out at two levels of acid concentration, namely 0.010 mol/l and 0.001 mol/l, and at a ratio of naphtha:acid solution of 50:50. Table 15 set forth below contains the results of these processes.

TABLE 15

Example No. 13. Evaluation of Nitrogen removal from a FCC naphtha full range

| TEST | RATIO NAPHTHA/ACID SOL % v/v | CONCENTRATION SOL(HCL) N(mol/l) | TIME (min) | TOT N2 wppm | BAS N2 wppm |
|---|---|---|---|---|---|
| FEED | — | — | — | 88.8 | 80.6 |
| 1 | 50/50 | 0.010 | 0 | 17.1 | 8.9 |
| 2 | 50/50 | 0.010 | 5 | 19.0 | 10.8 |
| 3 | 50/50 | 0.010 | 10 | 19.7 | 11.5 |
| 4 | 50/50 | 0.010 | 15 | 19.5 | 11.3 |
| 5 | 50/50 | 0.010 | 30 | 89.9 | 76.1 |

TABLE 15-continued

Example No. 13. Evaluation of Nitrogen
removal from a FCC naphtha full range

| TEST | RATIO NAPHTHA/ACID SOL % v/v | CONCENTRATION SOL(HCL) N(mol/l) | TIME (min) | TOT N2 wppm | BAS N2 wppm |
|---|---|---|---|---|---|
| 6 | 50/50 | 0.001 | 0 | 69.9 | 58.2 |
| 7 | 50/50 | 0.001 | 5 | 73.5 | 61.7 |
| 8 | 50/50 | 0.001 | 10 | 78.7 | 68.0 |
| 9 | 50/50 | 0.001 | 15 | 80.1 | 71.3 |
| 10 | 50/50 | 0.001 | 30 | 22.7 | 14.5 |
| 11 | 30/70 | 0.010 | 0 | 10.3 | 2.1 |
| 12 | 30/70 | 0.010 | 5 | 44.1 | 35.9 |
| 13 | 30/70 | 0.010 | 10 | 37.6 | 29.4 |
| 14 | 30/70 | 0.010 | 15 | 13.4 | 5.2 |
| 15 | 30/70 | 0.010 | 30 | 27.8 | 19.6 |
| 16 | 30/70 | 0.001 | 0 | 38.2 | 31.5 |

Figure 4:
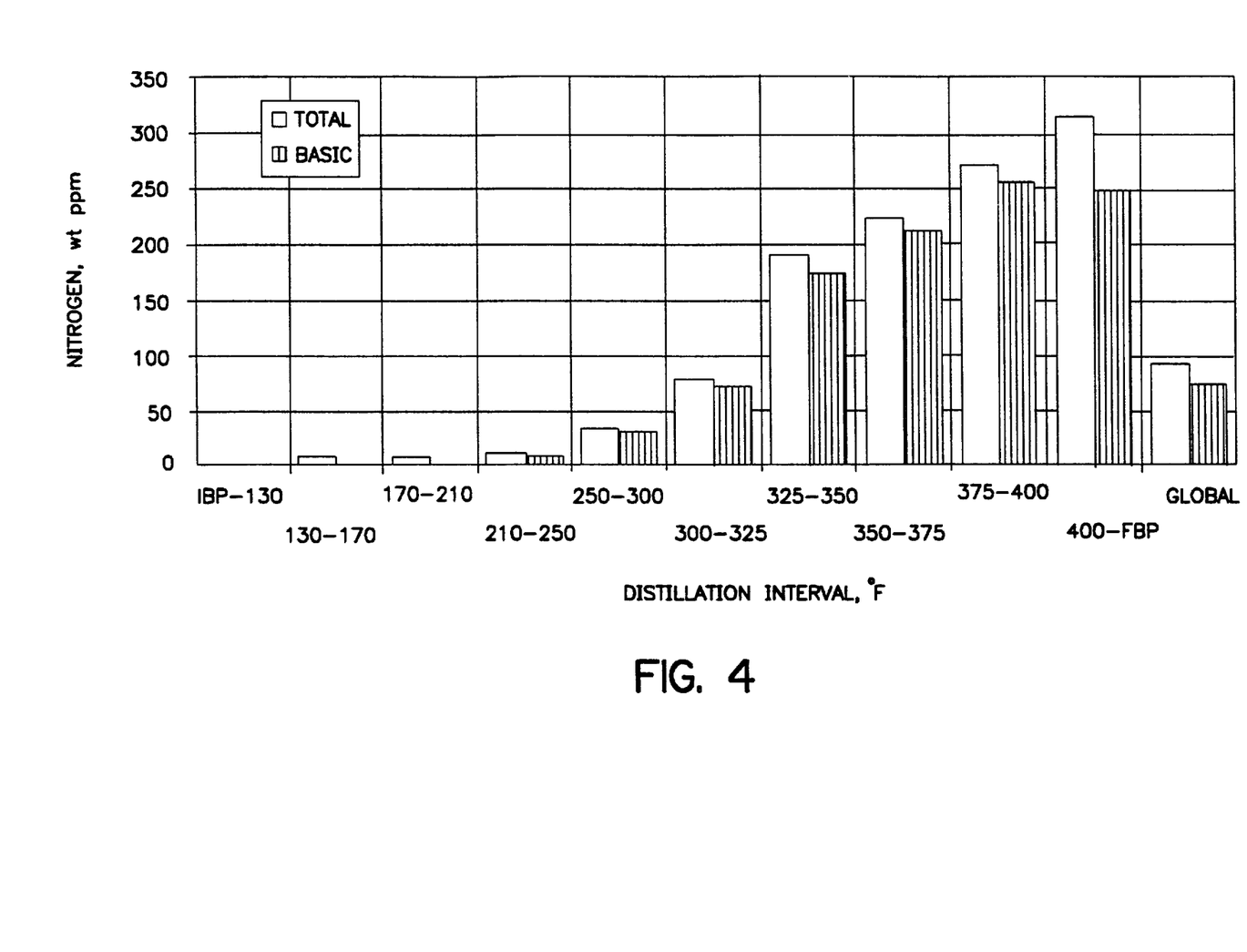
FIG. 4 illustrates a typical nitrogen distribution in an FCC naphta cut.
Figure 5:
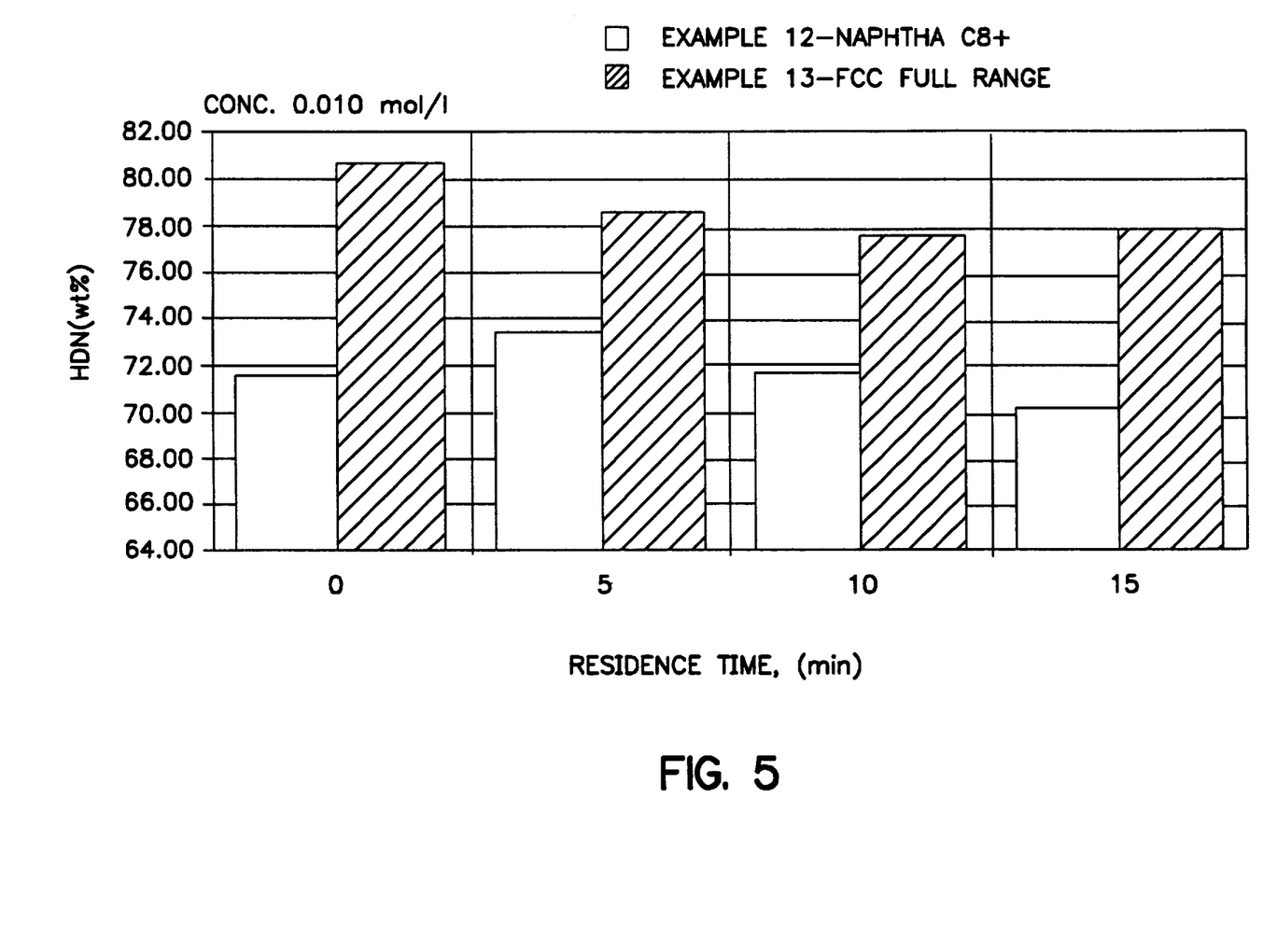
FIG. 5 is a comparison of the results of Examples 12 and 13.

As shown above in Table 15, these results demonstrate the same patterns observed with respect to Example 12 above. This is as expected, because the C8-fraction in the full range naphtha represents about 10 percent volume, and the nitrogen content in this light fraction is less than 1 ppm wt. as can be observed from the typical nitrogen content in the FCC cuts distribution curve attached hereto as FIG. 4. In light of the low nitrogen content of the C8-fraction of the full range naphtha, an effective reduction of nitrogen content to acid solution is accomplished at the 50:50 ratio used, thereby providing a slight improvement in nitrogen removal when using the full range naphtha feedstock. FIG. 5 attached hereto illustrates this comparison as between the results of Examples 12 and 13.

EXAMPLE 14

Figure 6:
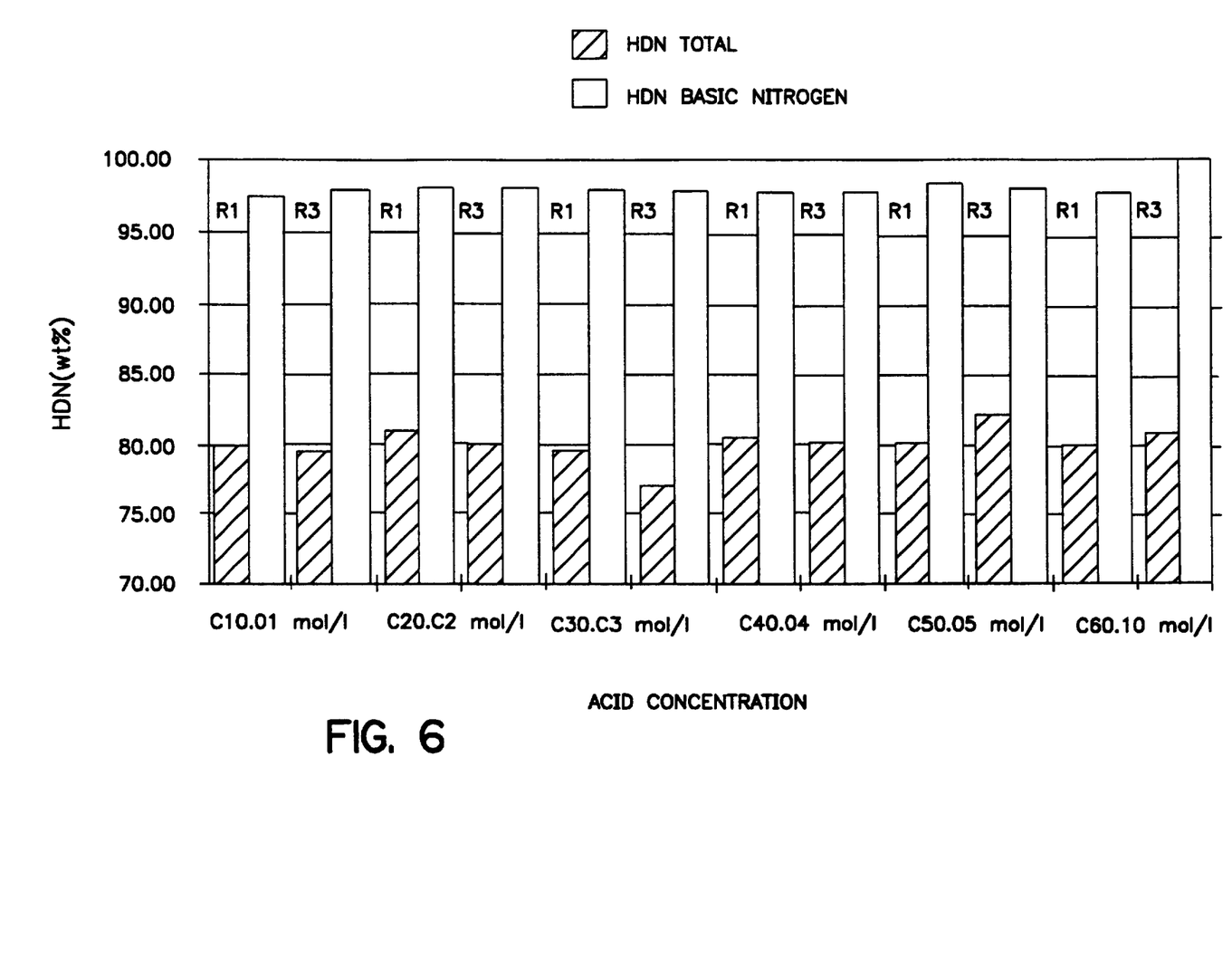
FIG. 6 illustrates nitrogen removal from a coker naphtha feedstock for ratios of naphtha:acid solution of 50:50 (R1) and 30:70 (R3).

This example demonstrates a nitrogen removal process according to the present invention using an unstable naphtha from a FLEXI-COKER unit. In this example, the acid concentration was varied between 0.01 mol/l and 0.1 mol/l, at ratios of naphtha:acid solution of 50:50 and 30:70, and for five hours residence time. FIG. 6 attached hereto illustrates that most basic nitrogen is removed (97 wt. %) even at 0.01 mol/l acid concentration. It is also observed that no substantial increase in extraction of nitrogen is accomplished by increasing the acid concentration above 0.01 mol/l, or by decreasing the naphtha:acid solution ratio.

Also in this example, the low nitrogen content naphtha produced in accordance with the invention was evaluated for any increase in chlorine content. The results are set forth below in Table 16. As shown, in most cases there was only a slight increase, on the order of less than one ppm (wt.) of chlorine with respect to the initial amount in the naphtha. Further, this additional chlorine was in inorganic form, which indicates the likelihood that the additional chlorine is due to traces of acid solution remaining in the naphtha feedstock.

TABLE 16

Example No. 14. Nitrogen removal from a
coker naphtha (HKN)

| TEST | RATIO NAPHTHA/ACID SOL % v/v | CONCENTRATION SOL(HCL) N(mol/l) | TIME (min) | TOT N2 wppm | BAS N2 wppm | SULFUR wppm | TOT CL wppm | INORG CL wppm |
|---|---|---|---|---|---|---|---|---|
| FEED | — | — | — | 126.CO | 107.1C | 8590 | 0.17 | 0.16 |
| 1 | 50/50 | 0.010 | 5 | 25.30 | 2.68 | 6920 | 3.70 | 3.62 |
| 2 | 70/30 | 0.010 | 5 | 25.80 | 2.13 | — | — | — |
| 3 | 50/50 | 0.020 | 5 | 24.00 | 1.96 | 8840 | 0.19 | 0.17 |
| 4 | 70/30 | 0.020 | 5 | 25.10 | 1.96 | — | — | — |
| 5 | 50/50 | 0.030 | 5 | 25.70 | 2.10 | 8910 | 0.17 | 0.16 |
| 6 | 70/30 | 0.030 | 5 | 29.00 | 2.13 | — | — | — |
| 7 | 50/50 | 0.040 | 5 | 24.60 | 2.20 | 8460 | 0.39 | 0.37 |
| 8 | 70/30 | 0.040 | 5 | 25.00 | 2.17 | — | — | — |
| 9 | 50/50 | 0.050 | 5 | 25.00 | 1.49 | 8550 | 1.50 | 1.44 |
| 10 | 70/30 | 0.050 | 5 | 22.50 | 1.78 | 8820 | 2.30 | 2.22 |
| 11 | 50/50 | 0.100 | 5 | 25.40 | 2.15 | 8610 | 2.14 | 2.09 |
| 12 | 70/30 | 0.100 | 5 | 24.10 | <1 | 8660 | 1.86 | 1.80 |

As shown in Table 16, the insignificant increases of chlorine in the low nitrogen content naphtha feedstock obtained in accordance with the present invention do not increase the chlorine levels to any point outside the expected range of concentration.

EXAMPLE 15

In this example, an FCC heart cut (193°–271° F.) gasoline with a nitrogen content of 7 ppm wt. and additional properties as shown in Table 17 below was treated using a catalyst system in accordance with the present invention.

TABLE 17

| Feedstock Characterization Example No. 15 | |
|---|---|
| Naphtha Fraction | 193–271° F. |
| Percent of Full-Range | |
| Volume % | 19.8 |
| Weight % | 20.2 |
| Production Rate, bpsd | 8,000 |
| Specific Gravity | 0.764 |
| API Gravity | 53.6 |
| Sulfur, wppm | 1783 |
| Nitrogen, wppm | 7 |
| Bromine Number | 53.2 |
| Paraffins, vol % | 5.93 |
| Iso-Paraffins, vol % | 20.7 |
| Olefins, vol % | 24.9 |
| Naphthenes, vol % | 25.7 |
| Aromatics, vol % | 22.8 |
| Octane RON/MON | 85.7/77.9 |
| RVP, psig | 2.11 |
| Distillation, °F. | estimated |
| vol % | |
| IBP/5 | –/185 |
| 10/30 | 193/210 |
| 50/70 | 235/245 |
| 90/95 | 275/285 |
| FBP | – |

A reactor was filled with a catalyst including one-third of a commercial hydrotreating catalyst and two-thirds of ISAL catalyst (ISAL is a trademark of Intevep, S.A.). The operating conditions included a hydrogen partial pressure of 290 psig, a reactor temperature of 635° F., and a space velocity of 1.5 $H^{-1}$. Table 18 below sets forth the characteristics of the end product of this process. In this example, the sulfur content was reduced from 1,783 ppm wt. to 7 ppm wt., and olefin content was reduced from 24.9 vol. % to 2.8 vol. %. The motor octane number remained substantially constant. It is noted that a product with such properties is an excellent reformulated gasoline component.

TABLE 18

| ISAL Products Characterization Example No. 15 | |
|---|---|
| Stage | ISAL Hydroconversion |
| Liquid Yield (C5+) | |
| Volume % | 95.2 |
| Weight % | 94.8 |
| Specific Gravity | 0.7613 |
| API Gravity | 54.4 |
| Sulfur, wppm | 7 |
| Nitrogen, wppm | <1 |
| Bromine Number | <1 |
| Paraffins, vol % | 49.5 |
| Olefins, vol % | 2.8 |
| Naphthenes, vol % | 24.7 |
| Aromatics, vol % | 23.0 |
| Octane RON/MON | 81.4/77.9 |
| RVP, psig | 4.0 |
| Distillation, °F. | estimated |

TABLE 18-continued

| ISAL Products Characterization Example No. 15 | |
|---|---|
| Stage | ISAL Hydroconversion |
| vol % | |
| IBP/5 | –/162 |
| 10/30 | 173/215 |
| 50/70 | 228/240 |
| 90/95 | 275/287 |
| FBP | – |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for upgrading a nitrogen and sulfur rich heavy naphtha feedstock comprising the steps of:

providing a naphtha feedstock having an initial nitrogen content, an initial sulfur content and an initial octane number;

contacting said naphtha feedstock with an acid source so as to provide a reduced nitrogen feedstock having a reduced nitrogen content which is less than said initial nitrogen content;

contacting said reduced nitrogen feedstock with a hydroconversion catalyst system under a hydrogen atmosphere, temperature and pressure so as to provide a final product having a final nitrogen content which is less than said initial nitrogen content, a final sulfur content which is less than said initial sulfur content, and having a final octane number which is substantially equal to or greater than said initial octane number of the feedstock, and wherein said final product has an increased isomerized component and substantially no increase in aromatic content with respect to said feedstock.

2. A process according to claim 1, wherein said catalyst system comprises:

a catalytically active matrix;

a support medium distributed through the matrix and comprising a silicious molecular sieve material; and a catalytically active phase supported on the support medium and comprising a first metal selected from group IIIA of the periodic table of elements and a second metal selected from group VIB of the periodic table of elements.

3. A process according to claim 1, wherein said feedstock has an initial sulfur content of between about 1 ppm to about 20,000 ppm.

4. A process according to claim 3, wherein said final sulfur content is between about 30% to about 60% less than said initial sulfur content.

5. A process according to claim 1, wherein said final octane number is greater than said initial octane number by between about 2 to about 40.

6. A process according to claim 1, wherein said feedstock is a heavy straight run naphtha, and wherein said final octane number is greater than said initial octane number by between about 30 to about 40.

7. A process according to claim 1, wherein said feedstock is a heavy cracked naphtha, and wherein said final octane number is greater than said initial octane number by between about 2 to about 10 numbers.

8. A process according to claim 2, wherein said matrix has a surface area of between about 50 $m^2/g$ to about 290 $m^2/g$, and wherein said support medium has a surface area of between about 250 $m^2/g$ to about 1200 $m^2/g$.

9. A process according to claim 2, wherein said matrix comprises a first metal and a second metal selected from group IIIA of the periodic-table of elements.

10. A process according to claim 9, wherein said first metal is aluminum and said second metal is gallium.

11. A process according to claim 9, wherein said matrix further comprises a third metal selected from group VIII, a fourth metal selected from group VIB, and a fifth metal selected from group VA of the periodic table of elements.

12. A process according to claim 11, wherein said first metal is aluminum, said second metal is gallium, said third metal is selected from the group consisting of cobalt, nickel and mixtures thereof, said fourth metal is selected from the group consisting of molybdenum, chromium and mixtures thereof, and said fifth metal is phosphorus.

13. A process according to claim 12, wherein said third metal is cobalt and said fourth metal is molybdenum.

14. A process according to claim 1, wherein said contacting step comprises the steps of mixing said feedstock with an acid solution having a desired acid concentration so as to provide a mixture of said reduced nitrogen feedstock and a nitrogen containing solution, and separating said reduced nitrogen feedstock from said nitrogen containing solution.

15. A process according to claim 14, further comprising the steps of treating said nitrogen containing solution so as to remove nitrogen and provide said acid solution, and repeating said contacting step.

16. A process according to claim 15, wherein said nitrogen containing solution contains nitrogen salt, and wherein said treating step comprises removing said nitrogen salt and adding acid sufficient to provide said acid solution with said desired acid concentration.

17. A process according to claim 14, wherein said mixing step comprises mixing said feedstock and said acid solution at a ratio of feedstock:solution of less than or equal to about 50:50 by volume.

18. A process according to claim 14, wherein said mixing step comprises mixing said feedstock and said acid solution at a ratio of feedstock:solution of between about 50:50 to about 30:70 by volume.

19. A process according to claim 14, wherein said desired acid concentration is at least about 0.001 mol/liter.

20. A process according to claim 14, wherein said desired acid concentration is between about 0.001 mol/liter to about 0.01 mol/liter.

21. A process according to claim 14, wherein said acid solution comprises a solution of an acid selected from the group consisting of hydrochloric acid, sulfuric acid, nitric acid and mixtures thereof.

22. A process according to claim 1, wherein said naphtha feedstock has said initial nitrogen content of at least about 10 ppm (wt), and wherein said acid source contains acid in an amount less than or equal to about 10 times said initial nitrogen content on a per unit time basis.

23. A process for removing nitrogen from a nitrogen rich naphtha feedstock, comprising the steps of:

providing a naphtha feedstock having an initial nitrogen content; and contacting said naphtha feedstock with an acid source so as to provide a reduced nitrogen content feedstock, wherein said contacting step comprises the steps of mixing said feedstock with an acid solution having a desired acid concentration so as to provide a mixture of said reducing nitrogen feedstock and a nitrogen containing solution, separating said reduced nitrogen feedstock from said nitrogen containing solution, and treating said nitrogen containing solution so as to remove nitrogen to provide a portion of said acid solution, and repeating said contacting step with said acid solution.

24. A process according to claim 23, wherein said nitrogen containing solution contains nitrogen salt, and wherein said treating step comprises removing said nitrogen salt and adding acid sufficient to provide said acid solution with said desired acid concentration.

25. A process according to claim 23, wherein said mixing step comprises mixing said feedstock and said acid solution at a ratio of feedstock:solution of less than or equal to about 50:50 by volume.

26. A process according to claim 23, wherein said mixing step comprises mixing said feedstock and said acid solution at a ratio of feedstock:solution of between about 50:50 to about 30:70 by volume.

27. A process according to claim 23, wherein said desired acid concentration is at least about 0.001 mol/liter.

28. A process according to claim 23, wherein said desired acid concentration is between about 0.001 mol/liter to about 0.01 mol/liter.

29. A process according to claim 25, wherein said acid solution comprises a solution of an acid selected from the group consisting of hydrochloric acid, sulfuric acid, nitric acid and mixtures thereof.

30. A process according to claim 23, wherein said naphtha feedstock has said initial nitrogen content of at least about 10 ppm (wt), and wherein said acid source contains acid in an amount less than or equal to about 10 times said initial nitrogen content on a per unit time basis.

* * * * *